Patented June 11, 1940

2,204,009

UNITED STATES PATENT OFFICE 2,204,009

INSECTICIDAL AGENT

Herman A. Bruson, Philadelphia, Pa., assignor to Röhm & Haas Company, Philadelphia, Pa.

No Drawing. Application March 2, 1939, Serial No. 259,317

19 Claims. (Cl. 167—22)

This invention relates to a new class of substances useful as insecticides, which are effective alone or in conjunction with other materials valued for their insecticidal or fungicidal activity. The new substances described herein are unique in that they not only provide sprays with insecticidal action, but also wetting, spreading and adhesive or sticking actions, which are necessary for the full utilization of parasiticidal ingredients in horticultural or agricultural sprays.

The object of this invention is to provide an organic material which is effective in insecticidal sprays and which is relatively non-toxic to domestic animals and to human beings. It is also an object to provide an insecticide which is self-contained in wetting, spreading, and sticking properties and which does not, therefore, require auxiliary substances to give these actions. It is a further object to provide an insecticide which is non-injurious to foliage and safe to use on even the most delicate, living plants. It is a still further object to provide a material which may be combined with other insecticidal and with fungicidal principles and supplement or enhance the effectiveness thereof. It is a still further object to provide a material which is itself of insecticidal value and which can disperse or emulsify other active agents.

The substances found of particular value as new insecticides are, in general, thick, balsam-like materials obtained by reacting a substantial proportion of a monobasic, aliphatic acid, which is not of the drying type, or of a cycloaliphatic acid and a lesser amount of a resin-forming, dicarboxylic acid with polyglycerol. The resulting composition disperses readily in water to yield aqueous sprays or it is soluble or easily dispersible in oils or oily insecticidal materials which may be used in this form or in aqueous sprays.

The monobasic, aliphatic acids which are useful contain from eight carbon atoms upward. They may possess a chain interrupted by oxygen. Typical acids which are useful in these products include caproxyacetic acid, capryl phenoxyacetic acid, undecylenic acid, caprylic acid, lauric acid, palmitic acid, ricinoleic acid, and oleic acid. Pure acids may be used or the commercial products obtainable from the various non-drying oils, such as cocoanut oil, castor oil, cottonseed oil, etc. The cycloaliphatic acids react much like the aliphatic acids. Of particular interest as a source of less expensive acids are the naphthenic acids from petroleum. Any individual, aliphatic acid of the types described, or cycloaliphatic acid, or mixtures thereof, may be used as starting material.

The polyglycerol is prepared by heating glycerol at an elevated temperature in the presence of a little alkali. In the preferred procedure about 1% potassium hydroxide is used and the glycerol is stirred at 250–260° C. in an inert atmosphere until there has been a weight loss of 25–30%. The viscosity of the polyglycerol should then be such that a 75% solution in water corresponds to "D" on the Gardner-Holdt scale.

The resin-forming, dicarboxylic acids which have proved to be of value include phthalic, succinic, maleic and sebacic acids.

In preparing the insecticidal product from these various materials, the polyglycerol, the monobasic aliphatic or cycloaliphatic acid and the resin-forming acid are mixed and heated under an inert atmosphere until the acid number of the resulting product is less than 15 and the viscosity is about "B" to "C" on the Gardner-Holdt scale.

The resulting product is thick and rather syrupy at ordinary temperatures. It may solidify in the cold, but melts again on warming. Films of the product are non-drying and somewhat sticky. The product is dispersible or soluble in water and oils.

In the preferred compositions usually about twice as much of the monobasic aliphatic or cycloaliphatic acid is taken as of polyglycerol. These acids, in general, constitute from about 45 to about 75% of the total materials reacted, while the polyglycerol makes up 20 to 40%. The amount of resin-forming dicarboxylic acid which can be used does not exceed 15% of the materials and may be as low as 3%. The exact proportions of the various starting materials which are reacted depend upon the particular materials selected. The proportions must be so adjusted that a homogeneous, non-drying material results. If more dicarboxylic acid is used, there is danger of separation of a resinous mass and an oily layer of a typical non-dispersible resin results. Further, the proportion must be such that a low acid number is reached without overlong heating of the reacting materials. With excessive periods of heating the acid number is apt to increase rather than decrease.

If the acid number is not below 15, as determined by the usual methods used in resin and varnish making, the resulting product is usually injurious to foliage. It cannot be safely applied to delicate plants. Free fatty acid, particularly in emulsified form, is highly irritating to all plants investigated. When the acid number is between 15 and 5, the reaction product may be applied alone or in combination with other spray materials without danger to the more resistant plants and only slight injury to the others. When the acid number is less than 5, the reaction product can be applied even at relatively high concentrations without fear of injury to living plants.

Details of the preferred process of reacting polyglycerol, monobasic acid and resin-forming, dicarboxylic acid are given in the following examples.

Example 1

A product, hereinafter designated as A, was made from 100 parts of polyglycerol (prepared as shown above), 200 parts of undecylenic acid, and 20 parts of phthalic anhydride. These materials were mixed in an open kettle, heated to 200° C., and maintained at this temperature until the acid number of the mass had fallen below five. This required six and one-half hours. During this time a current of carbon dioxide gas kept an inert atmosphere above the reacting materials. Stirring was continuous and efficient. The product was thick and oily in appearance, but dispersed readily in water. It was miscible with thiocyanic acid esters, oils, hydrocarbon extracts of common insecticidal principles, etc.

In place of the undecylenic acid, there was used the fatty acid obtained from cocoanut oil. The reaction was carried on for about six hours, at which time the acid number was between two and three. This product, called B below, was likewise thick and appeared oily. It was easily dispersible in water and miscible with other liquid organic insecticides.

Example 2

200 parts of naphthenic acid (average molecular weight 190) was combined in an open kettle with 100 parts of polyglycerol (viscosity "D" by the Gardner-Holdt scale, when in 75% aqueous solution) and with 20 parts of phthalic anhydride. The temperature of the mass was kept at 200° C. until the acid number was 2.8. As before, efficient stirring and an inert atmosphere were used. The product, designated C below, was a viscous syrup which was water-dispersible and miscible with oils.

Example 3

Glycerol was heated at 250° C. with 1% sodium hydroxide until a 75% solution of the product showed a viscosity at 25° C. of about D on the Gardner-Holt scale. 100 parts of this polyglycerol, 200 parts of sec. octyloxyacetic acid.

$$C_8H_{17}-O-CH_2-COOH$$

and 20 parts of phthalic anhydride were heated together at about 200° C. until the acid number of the product was less than three. This required three hours. As before, efficient stirring and an inert atmosphere were used. The product, shown as D below, was a thick, oily material which was water-dispersible and miscible with oils, liquid organic insecticides, etc.

The compositions made as described were tested against various insects on a wide variety of plants. The outstanding property of the new compositions is their freedom from phytocidal action. None of the preparations gave evidence of being corrosive or truly harmful to the plants. Yet the kills of insects were good. Aqueous sprays containing these compositions on the basis of 2 lbs. per 50 gallons of water (1:200) were applied to infested plants with a Hudson sprayer, and the kills obtained are given in the following tables. Counts of insects were made after 48 hours.

TABLE I
Kill of aphis in percentage

| Compound | On tomato | On lantana | On nasturtium |
|---|---|---|---|
| A | 82 | 90 | 94 |
| B | 45 | 84 | 55 |
| C | 74 | 74 | 76 |
| D | 89 | 90 | 90 |

TABLE II
Kill of red spiders in percentage

| Compound | On beans | On lantana | On primula |
|---|---|---|---|
| A | 65 | 66 | 48 |
| B | 64 | 45 | 77 |
| C | 68 | 63 | 65 |
| D | 73 | 97 | 88 |

TABLE III
Action on mealy bugs

| Compound | On coleus percent kill |
|---|---|
| A | 68 |
| B | 29 |
| C | 22 |
| D | 42 |

Since no real damage to the host plants was observed in the above tests, various plants were sprayed with the same compounds shown above, but at a ratio of 1:100. The plants were sprayed once each day for four days and observations made for injury. Plants used in this test included snapdragon, plume poppy, asparagus fern, nasturtium, and young tomato plants. Only in relatively few cases was any injury found, even under the severe conditions of the test. The high degree of safety of insecticides of the sort herein disclosed is thus one of their desirable features.

The new insecticidal materials may be mixed with oils used as diluents and with other parasiticidal principles, such as spray oils, pyrethrum extracts, derris extracts, organic thiocyanates 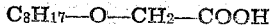 and other synthetic organic insecticides, fungicides, such as cuprous oxide, basic copper chloride, etc. Such mixtures are self-dispersing in water and give good coverage and excellent retention of the insecticidal materials. A typical mixture, containing neutral oils and 23% butoxyethoxy ethyl thiocyanate and 15% of the new insecticidal material, made with polyglycerol, lauric acid and phthalic anhydride, gave kills of 94% for red spiders on phlox without any plant injury when sprayed at a dilution of 1 to 300 in water. Another mixture containing ½% rotenone, 15% of the same new insecticidal material, and 11% butoxyethoxy ethyl thiocyanate with neutral oils was used for aqueous sprays at 1:300. Kills of 51% resulted with two-spotted mites on geranium, of 80% with red spider on roses, of 81% with aphis on rutabaga, of 89% with red spider on primula, of 93% with red spider on phlox, etc. Parasiticidal compositions containing the new insecticidal materials and cuprous oxide gave excellent control of both insect pests and fungi.

The herein disclosed products are useful in plant sprays against soft-bodied plant pests such as aphis, red spiders, adult white flies, the crawling young of scale, leaf hopper, and thrips. They are also useful as assistants in mosquito and fly sprays with a kerosene base and in cattle sprays whether anhydrous or aqueous. They are particularly useful in conjunction with other parasiticidal agents of all sorts in mixed sprays, being not only insecticidally active themselves but also providing auxiliary actions, as explained above, which aid these other agents in acting most effectively.

I claim:

1. A parasiticidal spray containing a dispersible composition comprising the reaction product of polyglycerol, a resin-forming, dicarboxylic acid and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

2. A parasiticidal spray containing a dispersible composition comprising the reaction product of polyglycerol, phthalic acid and an acid selected from the group consisting of monobasic, aliphatic acids which are not of the drying type and which possess at least 8 carbon atoms, monobasic, aliphatic acids having at least 8 carbon atoms, the chain of which is interrupted by an oxygen atom, and cycloaliphatic acids, said reaction product having an acid number less than fifteen.

3. A parasiticidal spray containing the reaction product of polyglycerol, phthalic acid and a monobasic, aliphatic acid which is not of the drying type and which possesses at least 8 carbon atoms, said reaction product having an acid number less than fifteen.

4. A spray for application to living plants which comprises water and an agent consisting essentially of the reaction product of polyglycerol, a resin-forming, dicarboxylic acid and an acid selected from the group consisting of monobasic, aliphatic acids which are not of the drying type and which possess at least 8 carbon atoms, monobasic, aliphatic acids, having at least 8 carbon atoms, the chain of which is interrupted by an oxygen atom, and cycloaliphatic acids, said reaction product having an acid number less than fifteen.

5. A spray for application to living plants which comprises water and an insecticidal agent consisting essentially of the reaction product of polyglycerol, phthalic acid and a monobasic, aliphatic acid which is not of the drying type and which possesses at least 8 carbon atoms, said reaction product having an acid number less than fifteen.

6. The spray of claim 5 in which the aliphatic acid is undecylenic acid.

7. The spray of claim 5 in which the aliphatic acid is lauric acid.

8. A water-dispersible, anhydrous insecticidal agent, having an acid number less than 15, consisting essentially of the reaction product of polyglycerol with an acid selected from the group consisting of monobasic, aliphatic acids, which are not of the drying type, and which possess at least 8 carbon atoms, monobasic, aliphatic acids having at least 8 carbon atoms, the chain of which is interrupted by an oxygen atom, and cycloaliphatic acids and with a resin-forming, dicarboxylic acid which constitutes less than 15% of the reacting materials.

9. A water-dispersible, anhydrous insecticidal agent, having an acid number less than 15, consisting essentially of the reaction product of polyglycerol with a monobasic, aliphatic acid, which is not of the drying type, and which possesses at least 8 carbon atoms, and with a resin-forming, dicarboxylic acid which constitutes less than 15% of the reacting materials.

10. A water-dispersible, anhydrous insecticidal agent, having an acid number less than 15, consisting essentially of the reaction product of polyglycerol, a monobasic aliphatic acid which is not of the drying type and which possesses at least 8 carbon atoms, and phthalic acid to the extent of less than 15% of the reacting materials.

11. The product of claim 10 in which the monobasic aliphatic acid is undecylenic acid.

12. The product of claim 10 in which the monobasic aliphatic acid consists of the fatty acid obtained from cocoanut oil.

13. A parasiticidal composition comprising a parasiticidal principle and a reaction product of polyglycerol, a resin-forming dicarboxylic acid, and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

14. A parasiticidal composition comprising an organic thiocyanate effective as an insecticidal agent, and the reaction product of polyglycerol, a resin-forming dicarboxylic acid, and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

15. An insecticidal spray containing a dispersible composition comprising butoxyethoxy ethyl thiocyanate and the reaction product of polyglycerol, a resin-forming dicarboxylic acid and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

16. An insecticidal spray containing a dispersible composition comprising rotenone and the reaction product of polyglycerol, a resin-forming dicarboxylic acid and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

17. An insecticidal spray containing a dispersible composition comprising butoxyethoxy ethyl thiocyanate and the reaction product of polyglycerol, phthalic anhydride and cocoanut fatty acid, said reaction product having an acid number less than fifteen.

18. An insecticidal spray containing a dispersible composition comprising butoxyethoxy ethyl thiocyanate and the reaction product of polyglycerol, phthalic anhydride and undecylenic acid, said reaction product having an acid number less than fifteen.

19. A parasiticidal spray containing cuprous oxide and a water-dispersible reaction product of polyglycerol, a resin-forming dicarboxylic acid and an acid selected from the group consisting of monobasic, aliphatic acids which are not of the drying type and which possess at least 8 carbon atoms, monobasic aliphatic acids, having at least 8 carbon atoms, the chain of which is interrupted by an oxygen atom, and cycloaliphatic acids, said reaction product having an acid number less than fifteen.

HERMAN A. BRUSON.